United States Patent [19]

McLean et al.

[11] 4,368,807

[45] Jan. 18, 1983

[54] RUBBER/VISCOUS TORSIONAL VIBRATION DAMPERS

[75] Inventors: Ronald L. McLean, Tonawanda; Gordon W. Kamman, Elma, both of N.Y.

[73] Assignee: Houdaille Industries, Inc., Fort Lauderdale, Fla.

[21] Appl. No.: 119,218

[22] Filed: Feb. 7, 1980

[51] Int. Cl.³ .............................................. F16F 7/10
[52] U.S. Cl. ..................................... 188/379; 74/574; 188/322.5
[58] Field of Search .............. 188/1 B, 378, 379, 268, 188/322.5; 74/574

[56] References Cited

U.S. PATENT DOCUMENTS

| | | | |
|---|---|---|---|
| 1,892,505 | 12/1932 | Evans | 74/574 |
| 1,939,855 | 12/1933 | Kreis | 74/574 |
| 3,603,172 | 9/1971 | Hall | 188/1 B |
| 4,114,246 | 9/1978 | Kamman | 188/1 B |
| 4,200,004 | 4/1980 | Bremer | 74/574 |
| 4,262,553 | 4/1981 | Bremer | 74/574 |

FOREIGN PATENT DOCUMENTS 828266 2/1960 United Kingdom .................. 74/574

*Primary Examiner*—Edward R. Kazenske
*Attorney, Agent, or Firm*—Hill, Van Santen, Steadman, Chiara & Simpson

[57] ABSTRACT

Tuned rubber/viscous torsional vibration damper assemblies of the kind having a supporting rotor disk mounting an inertia mass coupled to the disk by viscous damping medium and elastic tuning spring, spacing and sealing rubber rings located in rubber ring accommodating grooves. A viscous damping medium working chamber is defined within the inertia mass radially outwardly about the rings. The rubber rings are molded and vulcanized in situ in said grooves and to the rotor disk and the inertia mass. The dampers may be provided with rubber spacer and bumper fingers extending from the rubber rings into the working chamber of the damper. The rubber rings may also be keyed to the inertia mass by means of integral lugs extending into socket apertures in the inertia mass. The dampers may be coated with a rubber skin on outside areas, the skin being connected to exposed areas of the rubber rings.

10 Claims, 4 Drawing Figures

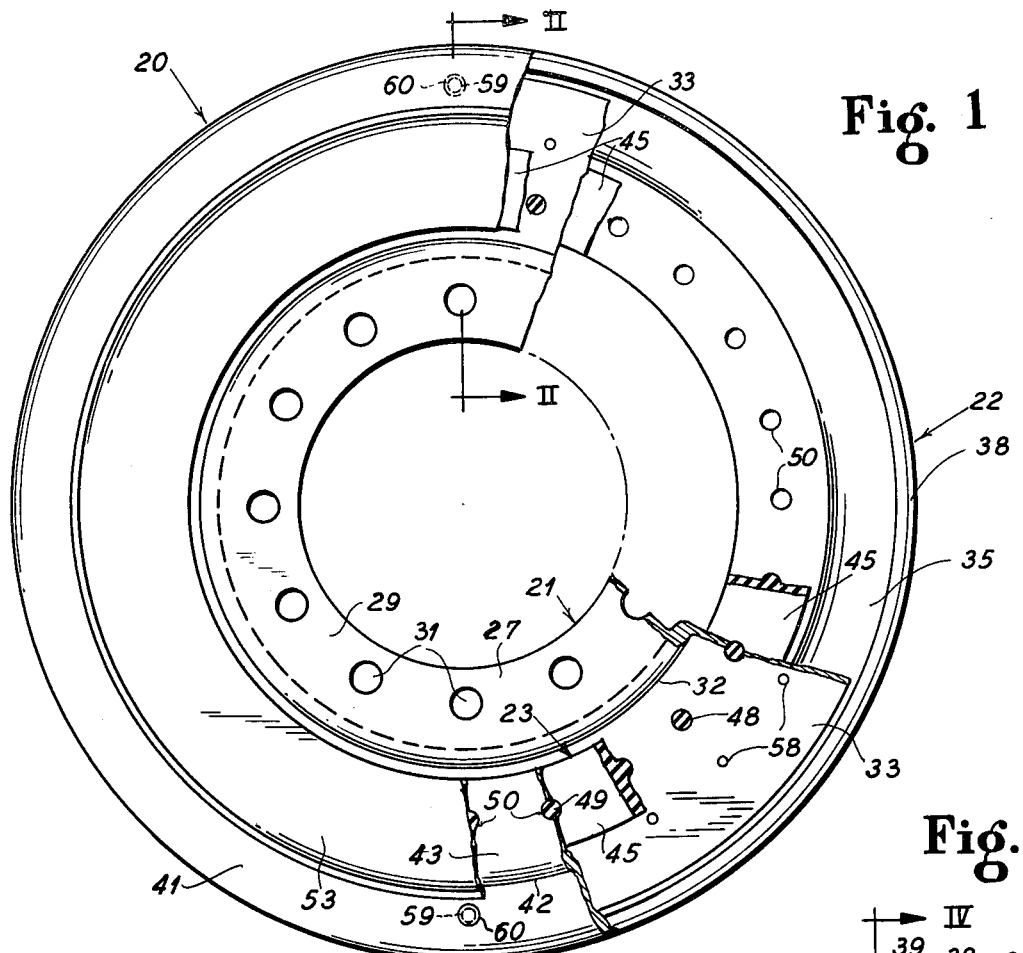
Fig. 1
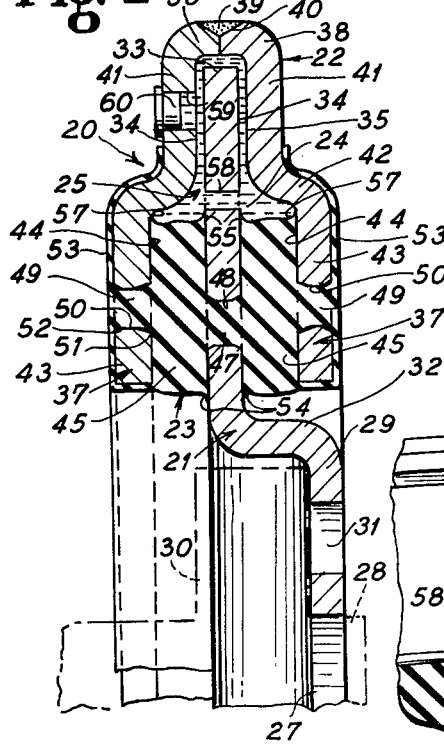
Fig. 2
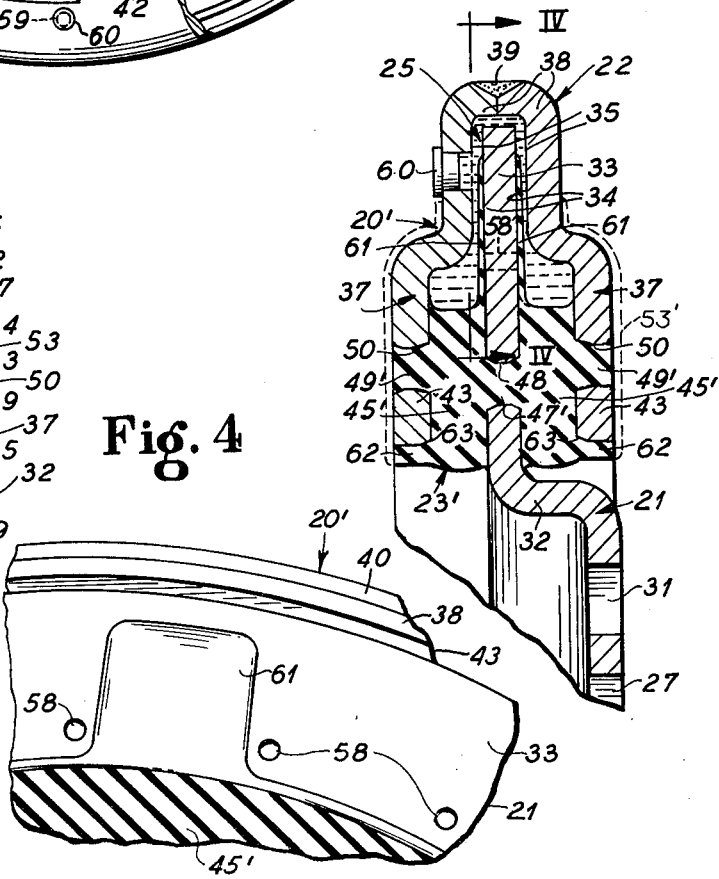
Fig. 3
Fig. 4

RUBBER/VISCOUS TORSIONAL VIBRATION DAMPERS

This invention relates to rubber/viscous torsional vibration dampers, and is more particularly concerned with such dampers of the type embodying an annular inertia mass mounted on a rotor disk and coupled thereto for damping purposes by means of not only a viscous damping medium but also by means of combination damping, sealing, connecting and spacer elastic rubber rings. Dampers of this type are especially useful for damping torsional vibrations in crankshafts of internal combustion engines of automotive road vehicles such as automobiles and trucks.

Several problems are encountered in the manufacture of these dampers. For purposes of economy, the principal parts of the dampers should be fabricated at as low cost and as standardized as practicable. By way of example, reference is made to U.S. Pat. No. 4,114,246 in which the damper comprises a rotor disk which is adapted to be economically fabricated as a stamping of heavy gauge metal such as steel. A pair of complementary stamped heavy gauge sheet metal, such as steel, plate members are joined to provide the annular inertia mass. Inwardly opening grooves in the inertia mass members have elastic tuning spring, spacing and sealing rings coupling opposite surface areas of the inertia mass and the rotor disk. Radially outwardly relative to the elastic rings a working chamber is defined by and housed within the inertia mass, and a viscous damping medium in such chamber operates between shear film spaced cooperatively confronting working surfaces of the rotor disk and the inertia mass.

In this type of damper, maintaining concentricity of the inertia mass members and the elastic rings and the rotor disk during assembly has always presented a problem. Further, numerous handling steps in assembling the parts and joining the elastic rings in the assembly have added to manufacturing costs. Adhesive bonding of the rubber rings to the other damper parts has presented a problem due to the severe stresses which must be resisted in service of the dampers. In situ vulcanization of the rubber rings has been a problem, because according to prior practice, molding of the rings to one part of the assembly has still required adhesive bonding to the other part of the assembly.

Within the working chamber the shear film spacings must be maintained critically in order to attain proper functioning of the damper in service. Therefore, where the damper is provided with separately formed and assembled elastic rings, extreme care must be taken to have the rings of identical size and durometer in order to attain the necessary uniform spacing between working surfaces in the working chamber.

An object of the invention is to provide a new and improved rubber/viscous torsional vibration damper assembly having novel means for assuring freedom from contact between working surfaces under operating circumstances where axial forces may tend to displace the working parts relatively toward one another.

A further object of the invention is to provide a new and improved tuned rubber/viscous torsional vibration damper having a unique interlocking of elastic tuning spring, spacing and sealing rings with the associated parts of the damper.

It is also an object of the invention to provide a new and improved tuned rubber/viscous torsional vibration damper assembly of the character indicated provided with a novel protective covering.

The invention provides a tuned rubber/viscous torsional vibration damper assembly having supporting rotor disk means with a radially outwardly extending circular body and a radially inner hub portion adapted to be secured to a rotary member such as a crankshaft subject to vibrations to be damped by the damper, said body being located concentrically within a radially inwardly opening annular working chamber of an annular inertia mass, said body dividing said working chamber into axially opposite sides, a viscous damping medium in each opposite side of said chamber between shear film spaced cooperatively confronting working surfaces of said body and said inertia mass, and said inertia mass having concentric annular grooves at opposite sides and facing axially toward said body radially inwardly adjacent to the opening from said chamber, there being elastic tuning spring, spacing and sealing rubber rings coupling surface areas on said inertia mass in said grooves with opposing surface areas on said body, comprising one or more of the following improvements (a) a circumferentially spaced plurality of rubber fingers extending radially from said rings and secured fixedly to certain of said working surfaces in each axial side of said working chamber, said fingers being of a thickness less than the shear film space between said working surfaces in each side of said working chamber, and functioning as spacers or bumpers to prevent direct contact between said working surfaces in the event of axial load or displacement forces tending to move said rotor disk and said inertia mass axially relative to one another; (b) an annular series of spaced apertures through said surface areas of said inertia mass, and integral lugs on said rings and filling said apertures; (c) said rubber rings having portions thereof exposed at the outside of said inertia mass, and a rubber skin coating outside areas of said inertia mass and connected to said exposed areas of said rings.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is a side face elevational view, partially broken away to reveal details of structure, of a rubber/viscous torsional vibration damper assembly embodying the invention;

FIG. 2 is an enlarged fragmentary sectional detail view taken substantially along the line II—II of FIG. 1;

FIG. 3 is a view similar to FIG. 2, but showing a modification; and

FIG. 4 is a sectional view taken substantially along line IV—IV of FIG. 3.

Referring to FIGS. 1 and 2, a completed tuned rubber/viscous torsional vibration damper 20 embodying the present invention comprises a rotor disk 21, an annular inertia mass 22 carried by the rotor disk 21, combination connecting, spacer, tuning and sealing elastic rubber ring means 23 and viscous damping medium 24 substantially filling a working chamber 25 defined within the inertia mass 22 in cooperation with the rotor disc 21.

In a preferred construction, the rotor disk 21 comprises a circular metal, such as steel, member comprising a circular stamping of the desired diameter adapted to be made with simple metal stamping dies. At its center, the disc 21 has an opening 27 through which a terminal portion of a crankshaft 28 is received and about which opening a hub portion 29 of the disc is attachable to a radial attachment flange 30 on the shaft 28, the hub 29 being provided with an annular series of bolt holes 31 for this purpose. Connected to the hub portion 29 by an offsetting bend 32 is an annular flat body portion 33 of substantial radial extent which projects into the working chamber 25 and has axially oppositely facing working surfaces 34 located in cooperative relation to confronting working surfaces 35 of the inertia mass 22. The working surfaces 34 and 35 are annular, parallel, and spaced apart equivalent to shear films of the viscous damping medium 24.

In a preferred construction, the annular inertia mass 22 comprises a pair of substantially identical concentric, complementary inertia members 37 which are formed as heavy gauge sheet metal stampings. For both the rotor disk 21 and the inertia plate members 37 hot rolled low carbon steel of 0.220 to 0.234 inch (5.588 mm to 5.944 mm) is satisfactory for dampers on the order of 12.31 inch (312.64 mm) outside diameter. Each of the stamped inertia mass parts or plates 37 has at its outer diameter an axially extending spacer flange 38 which in the completed assembly, abuts edge-to-edge the corresponding flange of the companion inertia plate 37. Although any preferred means for securing the plates 37 together may be employed, in a preferred structure, an annular weld 39 in a welding recess 40 across the joint between the flanges 38 not only serves to secure the plates 37 permanently together, but also provides a thorough seal against leakage through the joint from the working chamber 25. The joined flanges 38 are sized to maintain a proper spacing between the working surfaces 35 which are provided on annular radially outer portions 41 of the inertia plates 37. Along their radially inner ends, the inertia plate portions 41 are joined by respective juncture bends 42 to radially inner portions 43 which are spaced axially outwardly relative to the rotor disc body portion 33 to provide respective grooves 44 for accommodating the rubber ring means 23 comprising respective rubber rings 45 of as nearly as practicable equal dimensions and vulcanize bonded to respectively the disk body portion 33 and the axial wall surfaces defining the grooves 44. Depending upon the specific use requirements for the damper 20, various elastic materials, preferably synthetic, and all generically referred to herein as "rubber" may be selected from ethylene acrylic, vinyl acetate ethylene, ethylene propylene, epichlorohydrin, chlorosulfonated polyethylene, fluorocarbon, and the like. Any selected material must be capable of being molded, vulcanized and cured and vulcanize bonded to the associated part in situ. In an about 12 inch diameter damper as described, the rubber rings 45 may be about 1⅛ inch (28.575 mm) in their radial dimension between their inner and outer diameters and about ⅜ inch (9.5 mm) in thickness, i.e., axial dimension.

Not only to facilitate molding, but also to improve retention of the rings 45, the rings are connected by means of integral circumferentially spaced connecting lugs 47 extending through apertures 48 in the disk body portion 33. In a damper of the dimensions indicated and wherein the dimension between the radially inner and radially outer diameters of the inertia mass 22 are about 2 7/16 inch (62 mm), the apertures 48 may be twenty-four in number, equally spaced, and about 0.025 inch (6.350 mm) in diameter. Desirably also, at their axially outer sides the elastic rings 45 are keyed by means of integral lugs 49 filling socket apertures 50 extending through wall surface areas defining the elastic ring grooves of the plate portions 43. Desirably, there are twenty-four of the holes 50 in each circumferential series, equally spaced and of about 0.250 inch (6.350 mm) diameter. In respect to the holes 50, they are desirably formed with frustoconical tapered enlargements 51 extending from about the center of the thickness of the associated plate 43 in each instance to the inner face of the plate, and narrower generally frustoconical enlargements 52 at the outer ends of the holes 50. This construction not only facilitates molding, but also improves the vulcanize bonding of the lugs 49 to the surfaces defining the holes 50.

Desirably, a rubber skin 53 integral with the radially inner diameters of the rubber rings 45 and integral with the lugs 49 covers the inner edges and the outer surfaces of the plate portions 43 and extends onto the offsetting juncture bends 42. For stability of bond under working stresses in the operation of the damper, fillets 54 are provided at the juncture of the inner diameters of the rubber rings 45 with the inertia disk 21. At the radially outer diameters of the rubber rings 45, fillets 55 connect the junctures of the rings with the disk 21, and fillets 57 connect the outer diameters of the rings at juncture with the plates 37.

At their radially outer edges, the elastic rings 45 are spaced radially inwardly relative to the offsetting bends 42, not only to avoid stressing engagement between the inner surfaces of the bends 42 and the outer edges of the rings, but also to provide substantial reservoir volume for the damping fluid 24 at the radially inner side of the working chamber 25. Connecting the reservoir volumes at each side of the disk portion 33 are holes 58 desirably located adjacent to the fillets 55 and provided in a spaced annular series of twenty-four holes of about 0.187 inch (4.750 mm) diameter. For filling the damper 20 with the damping medium fluid 24, such as a suitable viscosity silicone, each of the inertia plates 37 is provided with a filler hole 59 of suitable diameter such as 0.248-0.255 inch (6.299-6.477 mm). In the assembly, the respective holes 59 are preferably located at diametrically opposite sides of the damper to facilitate filling, utilizing one of the holes as the filler hole and the other of the holes as an air escape hole. After the damper has been filled, the holes 59 are respectively closed by means of plugs 60 which are desirably welded in permanently sealed relation to the associated plate.

In the modified damper 20' of FIGS. 3 and 4, the structural parts and relationships are substantially the same as in the form of FIGS. 1 and 2, and same reference characters identify the same parts, and for most of the identified parts, the description will not be repeated, for sake of brevity. In the damper 20', the elastic tuning spring, spacing and sealing rubber ring means 23' comprising the rings 45' is modified to the extent that integral thin flat rubber fingers 61 extend radially from the rings 45' at circumferentially spaced plurality of locations and are secured fixedly as by vulcanize bonding to certain of the working surfaces in the working chamber 25, in the illustrated instance to the working surfaces 34 of the rotor disk portion 33. The fingers 61 extend throughout the major extent of the working surfaces 34 and are of a width to extend in non-blocking relation to adjacent ones of the apertures 58. In a desirable arrangement, six of the fingers 61 may be provided located at about 60° circumferentially spaced intervals, that is, one of the fingers 61 between each four of the twenty-four apertures 58. The thickness of each of the fingers 61 is desirably only about half of the shear film spacing between the surfaces 34 and 35. Thereby, the fingers 61, since they are of a thickness less than the shear film space between the working surfaces in each side of the working chamber 25, avoid any interference with free relative torsional movement of the rotor disk 21 and the inertia mass 22 in operation of the damper, but the fingers 21 function as spacers or bumpers to prevent direct contact between the working surfaces 34 and 35 in the event of axial load or displacement forces tending to move the rotor disc 21 and the inertia mass axially relative to one another. This effectively avoids metal-to-metal contact of the rotor disk and the inertia mass. In this instance, the vulcanize bonded rings 45' may be provided at their radially inner edges with extensions 62 which lap and are bonded to the inner edges of the inertia plate portions 43. Each of the rings 45' also has lugs 49' extending through and bonded in apertures 50 in the plate portions 43, as well as lugs 47' bonded in apertures 48 in the disk 21. For stress relief and improved bonding, the inside corners of the inner edges of the inertia plate portions 43 may be provided with respective chamfers 63.

If desired, a rubber skin 53' similar to the skin 53 of FIGS. 1 and 2, may be provided on the outer surfaces of the plate portions 43 in FIG. 3, integral with the extensions 62 and the lugs 49'.

It will be understood that variations and modifications may be effected without departing from the spirit and scope of the novel concepts of this invention.

We claim as our invention:

1. A tuned rubber/viscous torsional vibration damper assembly having supporting rotor disk means with a radially outwardly extending circular body and a radially inner hub portion adapted to be secured to a rotary member such as a crankshaft subject to vibrations to be damped by the damper, said body being located concentrically within a radially inwardly opening annular working chamber of an annular inertia mass, said body dividing said working chamber into axially opposite sides, a viscous damping medium in each opposite side of said chamber between shear film spaced cooperatively confronting working surfaces of said body and said inertia mass, and said inertia mass having concentric annular grooves at opposite sides and facing axially toward said body radially inwardly adjacent to the opening from said chamber, there being elastic tuning spring, spacing and sealing rubber rings coupling surface areas on said inertia mass in said grooves with opposing surface areas on said body, comprising:

a circumferentially spaced plurality of rubber fingers extending radially from said rubber rings and secured fixedly to certain of said working surfaces in each axial side of said working chamber;

said fingers being of a thickness less than the shear film space between said working surfaces in each side of said working chamber, and functioning as spacers or bumpers to prevent direct contact between said working surfaces in the event of axial load or displacement forces tending to move said rotor disk and said inertia mass axially relative to one another;

an annular series of spaced apertures through said surface areas of said inertia mass;

integral lugs on said rings and filling said apertures;

said rubber rings having portions thereof exposed at the outside of said inertia mass;

and a rubber skin coating outside areas of said inertia mass and connected to said exposed areas of said rings.

2. A damper assembly according to claim 1, including apertures in said circular body, and lugs integrally connecting said rubber rings through said apertures through said circular body.

3. A tuned rubber/viscous torsional vibration damper assembly having supporting rotor disk means with a radially outwardly extending circular body and a radially inner hub portion adapted to be secured to a rotary member such as a crankshaft subject to vibrations to be damped by the damper, said body being located concentrically within a radially inwardly opening annular working chamber of an annular inertia mass, said body dividing said working chamber into axially opposite sides, a viscous damping medium in each opposite side of said chamber between shear film spaced cooperatively confronting working surfaces of said body and said inertia mass, and said inertia mass having concentric annular grooves at opposite sides and facing axially toward said body radially inwardly adjacent to the opening from said chamber, there being elastic tuning spring, spacing and sealing rubber rings coupling surface areas on said inertia mass in said grooves with opposing surface areas on said body, comprising:

a circumferentially spaced plurality of rubber fingers extending radially from said rubber rings and secured fixedly to certain of said working surfaces in each axial side of said working chamber;

said fingers being of a thickness less than the shear film space between said working surfaces in each side of said working chamber, and functioning as spacers or bumpers to prevent direct contact between said working surfaces in the event of axial load or displacement forces tending to move said rotor disk and said inertia mass axially relative to one another.

4. The apparatus according to claim 3 with
an annular series of spaced apertures through said surface areas of said inertia mass;
and integral lugs on said rubber rings and filling said apertures;
said apertures having tapered enlargements at their ends affording improved bonding of said rings to the surfaces defining said apertures;
said rubber rings having portions thereof exposed at the radially inner openings from said working chamber;
and a rubber skin coating outside axially facing areas of said inertia mass and connected to said exposed portions of said rings and to said integral lugs.

5. A damper assembly according to claim 4, wherein said rubber rings have fillets connecting their edges to said circular body.

6. A damper assembly according to claim 4, wherein said rubber rings have fillets connecting their edges to said inertia mass.

7. A damper according to claim 4 wherein said inertia mass has edges at said opening, said rubber rings have annular axial extensions on said edges, and said edges have respective chamfers at their inside corners providing stress relief for the rubber rings in the area of the chamfers.

8. A damper assembly according to claim 3, including annular reservoir spaces within said working chamber about the radially outer edges of said rubber rings, and holes extending through said body intermediate said fingers and connecting said reservoir spaces.

9. A tuned rubber/viscous torsional vibration damper assembly having supporting rotor disk means with a radially outwardly extending circular body and a radially inner hub portion adapted to be secured to a rotary member such as a crankshaft subject to vibrations to be damped by the damper, said body being located concentrically within a radially inwardly opening annular working chamber of an annular inertia mass, a viscous damping medium in said chamber between shear film spaced cooperatively confronting working surfaces of said body and said inertia mass, and said inertia mass having concentric annular grooves at opposite sides and facing axially toward said body radially inwardly adjacent to the opening from said chamber, there being elastic tuning spring, spacing and sealing rubber rings coupling annular surface areas on said inertia mass in said grooves with opposing annular surface areas on said body, an annular series of spaced apertures through said surface areas of said inertia mass, integral lugs on said rubber rings and filling said apertures, and comprising:
 a circumferentially spaced plurality of rubber fingers extending radially from said rubber rings and secured fixedly to certain of said working surfaces of said working chamber;
 said fingers being of a thickness less than the shear film space between said working surfaces at each axial side of said circular body and functioning as spacers or bumpers to prevent direct contact between said working surfaces in the event of axial load or displacement forces tending to move said rotor disk and said inertia mass axially relative to one another.

10. A tuned rubber/viscous torsional vibration damper assembly having supporting rotor disk means with a radially outwardly extending circular body and a radially inner hub portion adapted to be secured to a rotary member such as a crankshaft subject to vibrations to be damped by the damper, said body being located concentrically within a radially inwardly opening annular working chamber of an annular inertia mass, a viscous damping medium in said chamber between shear film spaced cooperatively confronting working surfaces of said body and said inertia mass, and said inertia mass having concentric annular grooves at opposite sides and facing axially toward said body radially inwardly adjacent to the opening from said chamber, there being elastic tuning spring, spacing and sealing rubber rings coupling surface areas on said inertia mass in said grooves with opposing surface areas on said body, said rubber rings having portions thereof exposed at the outside of said inertia mass, and comprising:
 a rubber skin coating outside areas of said inertia mass and connected to said exposed areas of said rings;
 and a circumferentially spaced plurality of rubber fingers extending radially from said rubber rings and secured fixedly to certain of said working surfaces in said working chamber;
 said fingers being of a thickness less than the shear film space between said working surfaces, and functioning as spacers or bumpers to prevent direction contact between said working surfaces in the event of axial load or displacement forces tending to move said rotor disk and said inertia mass axially relative to one another.

* * * * *